United States Patent [19]

Namiki

[11] 4,202,122
[45] May 13, 1980

[54] SELF-SUPPORTING UNITARY PLATE FOR HOLDING PHOTOGRAPHIC SLIDES

[75] Inventor: Naokuni Namiki, Hoya, Japan

[73] Assignee: Slidex Corporation, Tokyo, Japan

[21] Appl. No.: 927,411

[22] Filed: Jul. 24, 1978

[30] Foreign Application Priority Data

Aug. 30, 1977 [JP] Japan ............... 52-115238[U]

[51] Int. Cl.$^2$ .............................................. G09F 1/10
[52] U.S. Cl. .................................. 40/158 B; 40/159; 40/405
[58] Field of Search ............... 40/158 B, 158 R, 159, 40/154, 152, 374, 373, 367, 405, 10 D, 10 R

[56] References Cited

U.S. PATENT DOCUMENTS

| | | | |
|---|---|---|---|
| 2,968,882 | 1/1961 | Ozeki | 40/374 |
| 3,958,348 | 5/1976 | Sakamoto | 40/158 R |

*Primary Examiner*—John F. Pitrelli
*Assistant Examiner*—G. Lee Skillington
*Attorney, Agent, or Firm*—Fleit & Jacobson

[57] ABSTRACT

A self-supporting plate for holding photographic slides includes a unitary plate having a plurality of depressions spaced apart in lateral and longitudinal relationship and surrounded by two side partition walls and two end partition walls and having a substantially flat bottom wall. Each depression is adapted to receive a photographic slide therein. The self-supporting plate further comprises projections provided on and along part of the opposite side surfaces of the side partition walls, the projections being adjacent to one of the end partition walls in parallel spaced relation to the flat bottom and projecting inwardly of each depression. A groove is provided in the flat bottom of the depression between the mutually opposing projections of each depression, with its opposite side partition walls positioned on the opposite sides of a line on the bottom wall of the depression in parallel thereto. The line is coincident with a line interconnecting the front ends of the mutually opposing projections, as viewed in a direction to insert a photographic side. This arrangement ensures the holding of photographic slides, and also facilitates the insertion of a photographic slide into each depression.

6 Claims, 5 Drawing Figures

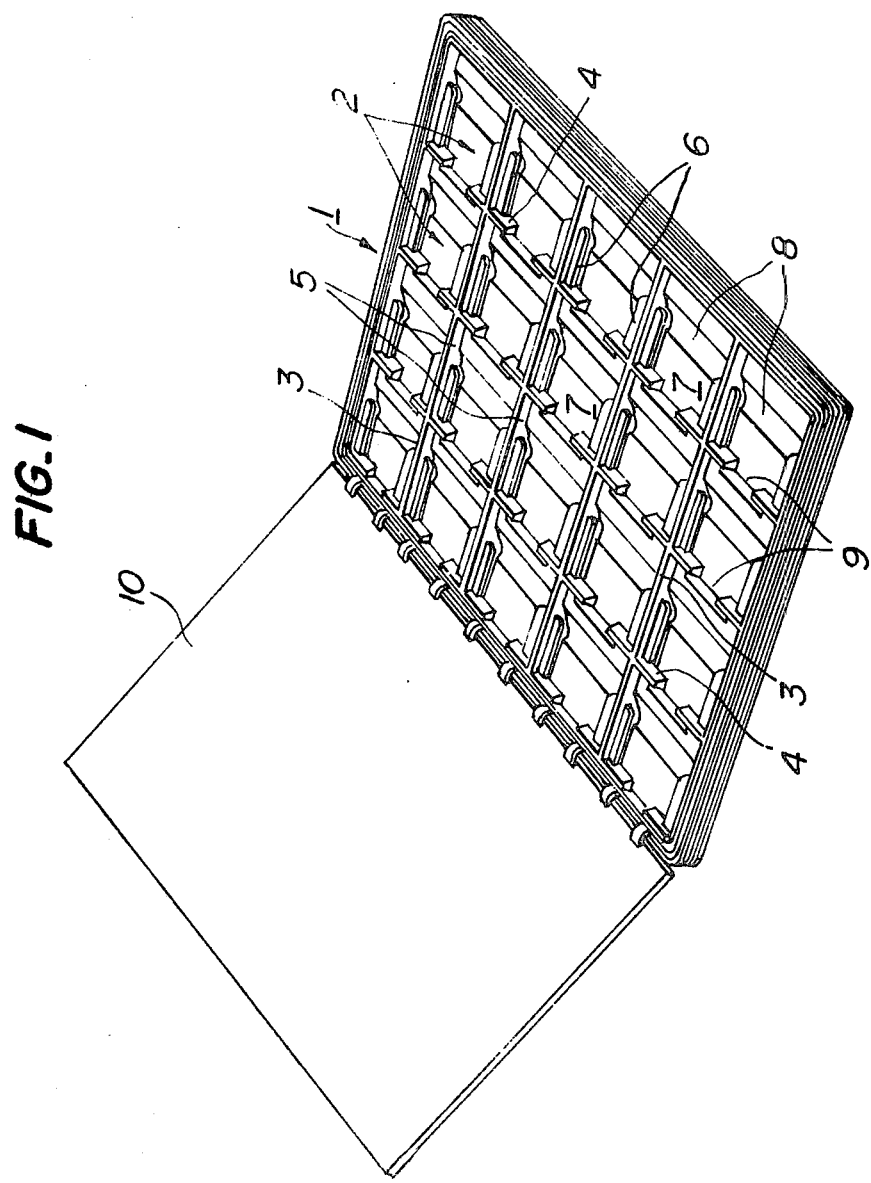

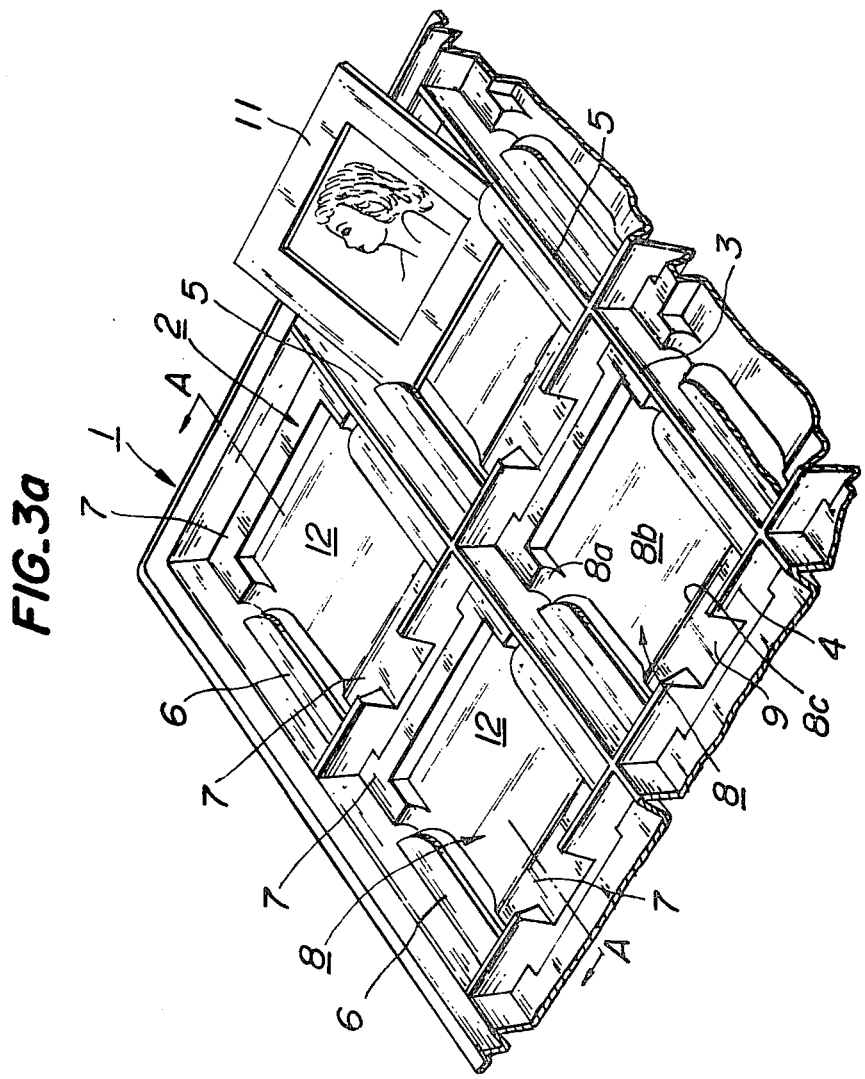
FIG.3a
FIG.3b
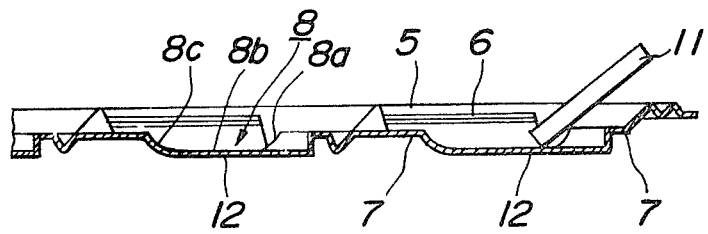

SELF-SUPPORTING UNITARY PLATE FOR HOLDING PHOTOGRAPHIC SLIDES

BACKGROUND OF THE INVENTION

This invention relates to a self-supporting unitary plate for filing and holding a number of photographic slides or the like, and more particularly to the improvements in a self-supporting unitary plate for filing and holding a number of photographic slides or the like, wherein a plurality of transparent photographic slides, preparations, or the like, each having a positive image thereon are held in a plurality of depressions partitioned in the form of a lattice by longitudinal and lateral walls on a unitary plate, thereby facilitating their insertion, removal of such photographic slides in or from such depressions, and the viewing of such slides while they are inserted in the depressions.

There have hitherto been proposed various attempts at providing such a self-supporting plate for holding photographic slides; one approach is to prepare such a plate from a single plastic plate by a press process; and the other is by laminating two or more card boards having plural openings which are in register with image-formed areas of respective photographic slides. Each tray or section of such self-supporting plates includes a flat bottom wall and mutually opposing projections for elastically holding part of a circumferential marginal portion of each photographic slide therebetween in cooperation with the bottom wall, in order to prevent an inserted photographic slide from being slipped off such tray or section. Such projections are formed on and along part of the opposite side surfaces of each partition wall between the neighboring trays and respectively project inward of each tray at a spacing from the bottom wall thereof, which spacing is substantially equal to or smaller to some extent than a thickness of the photographic slide. In many cases, the gap between each projection and the bottom wall of each tray is reduced at a point at which the front end portion of projection is located, as viewed in a direction to insert the photographic slide in a tray, so as to provide an increased force for elastically holding a photographic slide.

Such prior art self-supporting plates for holding photographic slides so far described have advantageously achieved a function of preventing the slipping-off of a photographic slide from a tray to the satisfaction of users thereof. Besides a requirement of positively holding photographic slides, such self-supporting plates have to meet another requirement of easiness of insertion of photographic slides in respective trays. The positive holding of photographic slides and the easiness of the insertion of photographic slides in trays are incompatible with each other for a single self-supporting plate. Reduction in gap between each projection and the bottom wall is effective for providing an increased force of holding a photographic slide, as has been attempted in the prior art self-supporting plate. On the other hand, upon insertion of a photographic slide in a tray, it is customary to introduce one end portion of the photographic slide in a gap between the projections and the bottom wall of the tray, with the photographic slide tilted to some extent. It is thus necessary to increase a gap between the front end of each projection and the bottom wall of each tray. Any of the prior art self-supporting plates described in the above have failed to meet this requirement and have been confronted with a problem in terms of difficulty in insertion of a photographic slide in a tray.

SUMMARY OF THE INVENTION

It is accordingly an object of the present invention to provide a self-supporting unitary plate for holding photographic slides, wherein a groove runs in a flat bottom of each depression between the mutually opposing side walls thereof, with its longitudinal opposite side walls positioned on the opposite sides of that line on the flat bottom of each depression in parallel thereto, which line is coincident with a line interconnecting the front ends of the mutually opposing projections of each depression, as viewed in a direction to insert a photographic slide, so as to provide a spacing large enough to receive one end portion of a photographic slide, when the same is inserted in a tilted fashion in the depression, thereby facilitating the insertion or removal of the photographic slide in or from the depression.

To attain the object, there is provided according to the present invention a self-supporting unitary plate for holding photographic slides in a plurality of depressions spaced apart in lateral and longitudinal relation on the same plane of a unitary plate, which comprises: projections provided on and along part of the opposite side surfaces of one partition wall between the neighboring depressions and projecting inward of each depression; and a groove running in a flat bottom of each depression between the mutually opposing partition walls, with its longitudinal opposite side walls positioned on the opposite sides of that line on the flat bottom of each depression in parallel thereto, which line is coincident with a line interconnecting one ends of the mutually opposing projections, which are located on the photographic-slide insertion side.

This and other objects and features of the present invention will be appararent from the ensuing part of the specification in conjunction with the drawings which indicate preferred embodiments of the invention.

BRIEF DESCRIPTION OF THE DRAWINGS

FIG. 1 is a perspective view of one embodiment of the present invention;

FIG. 3(a) is a fragmentary, enlarged perspective view of another embodiment; and FIG. 3(b) is a cross-sectional view taken along the line A—A of FIG. 3(a).

DESCRIPTION OF PREFERRED EMBODIMENTS

Figure 2A:
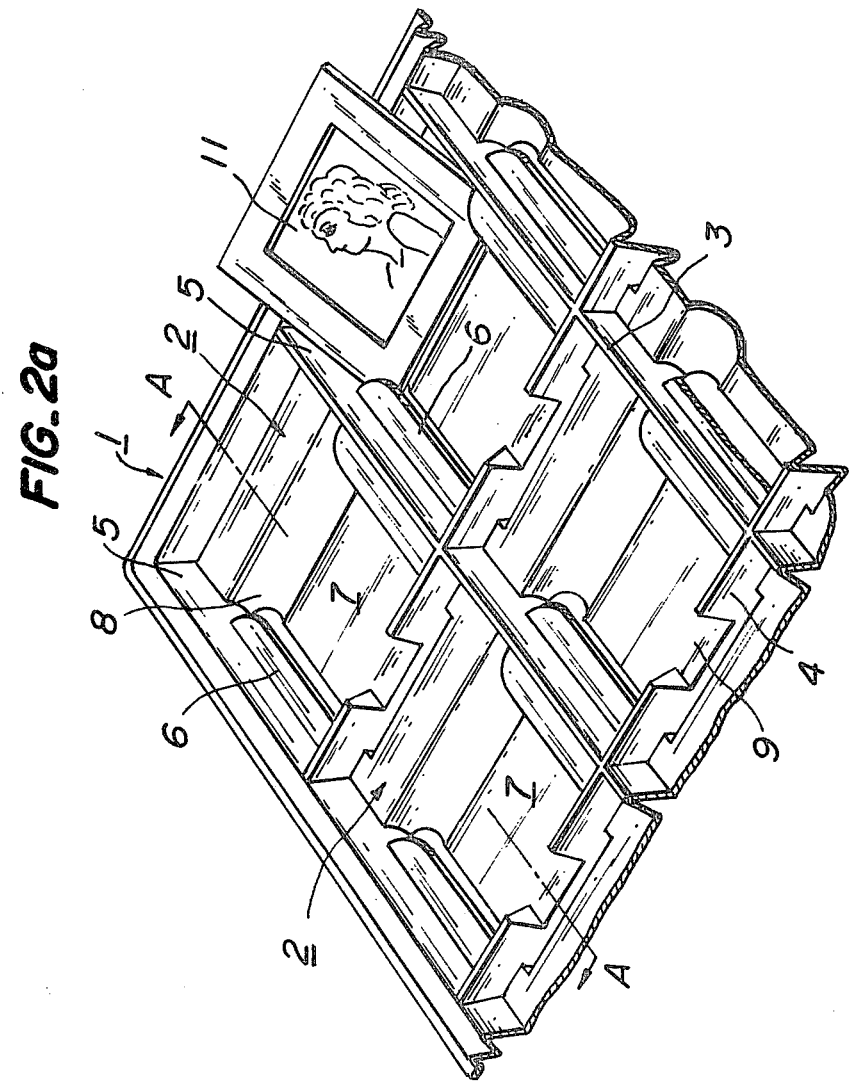
FIG. 2(a) is a fragmentary, enlarged perspective view of the self-supporting plate according to the present invention.

FIG. 1 illustrates a plurality of self-supporting plates 1 for holding therein a number of photographic slides, which plates 1 are bound at one side to form an album. Each plate 1 is comprised of: a plurality of depressions 2 arranged in parallel rows and columns; longitudinal and lateral partition walls 3 and 4 which define respective depressions 2; projections 6 formed on and along part of opposite side surfaces 5 of each longitudinal partition wall 3 between neighboring depression 2, as viewed in FIG. 2(a), and projecting inward of each depression 2; a groove 8 provided by the bulging part of a flat bottom wall 7 of each depression 2 in such a manner as to run between the mutually opposing longitudinal partition walls 3 with its longitudinal opposite side walls positioned on the opposite sides of that line on the bottom wall 7 of each depression 2 in parallel thereto, which line is coincident with a line interconnecting the front ends of the opposing projections 6 as viewed in a direction to insert a photographic slide; and a cut-off portion 9 provided in each lateral partition wall 4 serving as a first or second end wall of each depression. The plate thus constructed is obtained from an integral plastic plate by such as a press process. Designated 10 is a cover plate. The plate 1 can be either translucent or transparent according to the usage thereof.

Figure 2B:
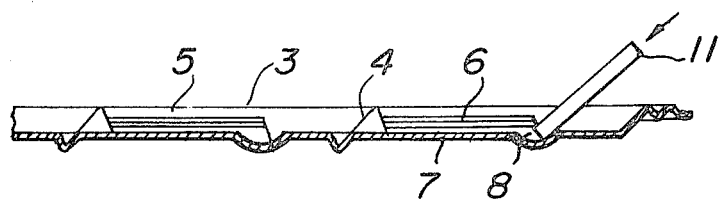
FIG. 2(b) is a cross-sectional view taken along the line A—A of FIG. 2(a)

FIG. 2(a) is a fragmentary, enlarged perspective view of FIG. 1. Groove 8 having a length commensurate to the width of a photographic slide should preferably be of substantially a semicircular shape in cross section, as best seen in FIG. 2(b).

In inserting a photographic slide 11 attached to a slide mount into depression 2 in self-supporting plate 1 thus constructed, one edge of photographic slide 11 is brought into engagement with bottom wall 7 of that depression while photographic slide 11 is tilted, and then photographic slide 11 is pressed downwards as the same is maintained in a tilted posture, so that one end of the slide will be slidingly introduced into groove 8. In this embodiment, the gap between the undersurface of each projection 6 and flat bottom wall 7 is greatly increased by the provision of groove 8, and this groove runs with the longitudinal side walls 3 thereof opposing to each other across a line on the flat bottom wall 7 of depression 2 which coincides with a line interconnecting the front ends of mutually opposing projections 6, such that the aforesaid one end portion of photographic slide 11 may be readily guided below to each projection 6 of that depression 2 by pressing the photographic slide 11 in the manner described. By continuously pressing photographic slide 11 downwards the aforesaid end portion of the slide 11 will be slidingly moved along the arcuate up-slope of groove 8 to ride on the flat bottom wall 7, and then photographic slide 11 will be slid on flat bottom wall 7 under the guidance of flat bottom wall 7 and mutually opposing projections 6, while slowly resuming a horizontal posture. When the aforesaid one end portion of photographic slide 11 comes into abutment against the base portion of lateral partition wall 4, the insertion of the slide in that depression 2 is completed, and photographic slide 11 is elastically held flat on the bottom wall 7 of that depression 2.

FIG. 3 is an enlarged view of a modified embodiment of the present invention, wherein groove 8 is provided in overlapping relation to a central rectangular recess 12 provided in bottom wall 7, so as to increase that dimension of central rectangular recess 12, which dimension, in the prior art plate, has been equal to an image-formed area of a photographic slide, the central rectangular recess being provided with a view to protecting the emulsion-fixed image bearing surface of photographic slide 11 from an unwanted contact with the bottom plane as well as from the impact that might be exerted on the back surface of the self-supporting unitary plate 1, and with a view to providing an increased mechanical strength.

In this embodiment, groove 8 includes arcuate down-slopes 8a terminated in front of one ends of opposing projections 6, a flat bottom 8b overlapping with a bottom of rectangular recess 12, and arcuate up-slopes 8c positioned below the rear half of respective projections 6, and facilitating the sliding movement of one end portion of a photographic slide 11 toward the rear part of bottom wall 7.

In insertion of a photographic slide in recess 12, the self-supporting plate 1 in this embodiment functions in substantially the same manner as in the former embodiment. Upon insertion of a photographic slide 11, arcuate down-slopes 8a guide one end portion of the photographic slide 11 between one ends of opposing projections 6 and rectangular recess 12; flat bottom 8b of rectangular recess 12 and mutually opposing projections 6 cooperate to guide photographic slide 11 to facilitate the sliding movement thereof, and arcuate up-slopes 8c guide one end portion of photographic slide 11 to facilitate the sliding movement thereof toward the rear part of bottom wall 7. Under the condition in which one end portion of photographic slide 11 rests on the rear end portion of bottom wall 7, the other end portion of photographic slide 11 rests on a front end portion of bottom wall 7 of depression 2, such that the photographic slide 11 may be elastically held by the mutually opposing projections 6 and depression 2.

In both embodiments, cut portion 9 serves to facilitate the insertion or removal of photographic slide 11 by fingertips.

In removing photographic slide 11 from depression 2, it is only necessary for a user to pull the photographic slide 11 by nipping or grasping the same at its other end portion by one's fingertips. Thus, the photographic slide 11 will be removed from depression 2 in the reverse manner to that of insertion.

The embodiments shown should not be considered in a limited sense, but various changes and modifications may be made by those skilled in the art without departing the spirit and scope of the invention and appended claims. For example, although each projection is located only in one half part of each depression, such projection may be provided in the central portion of each longitudinal partition wall of each depression. In the latter case, the insertion or removal of a photographic slide in or from a depression is made from the front end portion or rear end portion of the depression.

The arrangement according to the present invention ensures the holding of photographic slides and also facilitates the insertion of a photographic slide into each depression.

What is claimed is:

1. In a self-supporting plate for holding photographic slides including a unitary plate having a plurality of depressions spaced apart in lateral and longitudinal relationship and surrounded by two side partition walls and two end partition walls and having a substantially flat bottom wall, each of said depressions being adapted to receive a photographic slide therein; the improvements comprising:

projections provided on and along part of the opposite side surfaces of said side partition walls, said projections being adjacent to one of said end partition walls in parallel spaced relation to said flat bottom and projecting inwardly of each depression; and a groove running in said flat bottom of said depression between the mutually opposing projections of each depression, with its opposite side partition walls positioned on the opposite sides of a line on said bottom wall of said depression in parallel thereto, said line being coincident with a line interconnecting the front ends of said mutually opposing projections, as viewed in a direction to insert a photographic slide.

2. The improvements as defined in claim 1, wherein said groove is of a semi-circular shape in cross section.

3. The improvements as defined in claim 1, wherein the groove is provided in overlapping relation to a rectangular recess in said flat bottom of said depression, and said groove consists of arcuate down-slopes terminated at the front of said front end portions of said mutually opposing projections, said flat bottom overlapping with a bottom of said rectangular recess, and arcuate up-slopes positioned below the rear end portions of said projections and associated with the rear end portion of said bottom wall of said depression.

4. The improvements as defined in claim 1, wherein said self-supporting plate is formed by a translucent plastic material.

5. The improvements as claimed in claim 1, wherein said self-supporting plate is formed by a transparent plastic material.

6. An album for photographic slides, which comprises single press formed self-supporting plates for holding photographic slides including a unitary plate having a plurality of depressions spaced apart in lateral and longitudinal relationship and surrounded by two side partition walls and two end partition walls and having a substantially flat bottom wall, each of said depressions being adapted to receive a photographic slide therein, projections provided on and along part of the opposite side surfaces of said side partition walls, said projections being adjacent to one of said end partition walls in parallel spaced relation to said flat bottom and projecting inwardly of each depression, and a groove running in said flat bottom of said depression between the mutually opposing projections of each depression, with its opposite side partition walls positioned on the opposite sides of a line on said bottom wall of said depression in parallel thereto, said line being coincident with a line interconnecting the front ends of said mutually opposing projections, as viewed in a direction to insert a photographic slide;

means for binding said self-supporting plates; and a cover plate bound to said self-supporting plates for covering a first page thereof.

* * * * *